(12) United States Patent
Zhang et al.

(10) Patent No.: US 10,026,372 B2
(45) Date of Patent: Jul. 17, 2018

(54) ALTERNATING CURRENT-DIRECT CURRENT CONVERTER, POWER SUPPLY BOARD AND DISPLAY APPARATUS

(71) Applicant: BOE Technology Group Co., Ltd., Beijing (CN)

(72) Inventors: Kailiang Zhang, Beijing (CN); Masakazu Okamura, Beijing (CN); Jianbo Xian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 287 days.

(21) Appl. No.: 14/772,262

(22) PCT Filed: Nov. 28, 2014

(86) PCT No.: PCT/CN2014/092525
§ 371 (c)(1),
(2) Date: Sep. 2, 2015

(87) PCT Pub. No.: WO2016/023299
PCT Pub. Date: Feb. 18, 2016

(65) Prior Publication Data
US 2016/0260397 A1 Sep. 8, 2016

(30) Foreign Application Priority Data
Aug. 15, 2014 (CN) .......................... 2014 1 0404297

(51) Int. Cl.
*G09G 3/36* (2006.01)
*H02H 7/125* (2006.01)
(Continued)

(52) U.S. Cl.
CPC ......... *G09G 3/3648* (2013.01); *H02H 7/1252* (2013.01); *H02M 1/32* (2013.01);
(Continued)

(58) Field of Classification Search
CPC ........... H03K 17/0826; H03K 17/0822; H03K 19/00315; H03K 17/18; H03K 17/785;
(Continued)

(56) References Cited

U.S. PATENT DOCUMENTS 6,633,471 B1   10/2003  Ko
8,664,873 B2 *  3/2014  Zudrell-Koch .... H05B 33/0818
                                             315/224

(Continued)

FOREIGN PATENT DOCUMENTS

CN   200941563 Y   8/2007
CN   201247954 Y   5/2009
(Continued)

OTHER PUBLICATIONS

Sep. 7, 2016—(CN)—Second Office Action Appn 201410404297.8 with English Tran.
(Continued)

*Primary Examiner* — Thienvu Tran
*Assistant Examiner* — Nicolas Bellido
(74) *Attorney, Agent, or Firm* — Banner & Witcoff, Ltd.

(57) ABSTRACT

An AC-DC converter, power supply board and display apparatus is disclosed. The AC-DC converter comprises: an AC-DC converting circuit; a transformer, whose primary coil has a first terminal coupled to a positive output terminal of the AC-DC converting circuit, and second terminal connected to a load; a voltage monitoring circuit, whose input terminal is coupled to the first terminal of the secondary coil, and second terminal of the secondary coil connected to a ground; and a control circuit, whose input terminal is coupled to an output terminal of the voltage monitoring circuit, and output terminal coupled to the AC-DC converting circuit; wherein the voltage monitoring circuit outputs a control voltage when a voltage outputted by the first termi-
(Continued)

nal of the secondary coil of the transformer exceeds a first threshold; the control circuit controls the AC-DC converting circuit to stop providing power supply when the control voltage exceeds a second threshold.

16 Claims, 2 Drawing Sheets

(51) Int. Cl.
*H02M 7/06* (2006.01)
*H02M 1/32* (2007.01)
(52) U.S. Cl.
CPC .............. *H02M 7/066* (2013.01); *G09G 3/36* (2013.01); *G09G 2310/08* (2013.01); *G09G 2330/02* (2013.01); *G09G 2330/04* (2013.01); *G09G 2330/08* (2013.01); *H02M 7/06* (2013.01)
(58) Field of Classification Search
CPC ....... H03K 17/08122; H03K 17/08146; H03K 17/08142; H03K 17/08144; H03K 17/0824; H03K 17/962; H03K 17/945; H03K 17/955; H03K 17/9645; H01H 47/02; H01H 51/285; H01H 71/2445; H01L 21/82; H01L 27/0251; H01L 27/0266; H01L 27/0255; H03F 1/52; H02J 7/0031; G06F 1/28; H02H 3/202; H02H 3/247; H02H 3/04; H02H 3/093; H02H 1/0007; H02H 3/207; H02H 3/20; H02H 7/067; H02H 9/04; H02H 9/041; H02H 7/127; H02H 3/087; H02H 7/1213; H02H 7/1252; H02M 1/32; H02M 1/34; H02M 2001/348; H02M 7/066; H02M 7/06; H02M 1/088; H04N 3/20; G05F 1/569; G05F 1/613; G05F 1/573; G05F 1/5735; G05F 1/56; G05F 1/575; G05F 1/565; B64D 41/00; G01P 1/103; G09G 3/3648; G09G 2330/04; G09G 3/36; G09G 2330/02; G09G 2310/08; G09G 2330/08; H05B 39/085
USPC ................ 361/88–918, 18; 323/276; 307/116
See application file for complete search history.

(56) References Cited

U.S. PATENT DOCUMENTS

| 2002/0149266 | A1  |         | 10/2002 | Tahara |              |
|--------------|-----|---------|---------|--------|--------------|
| 2011/0095733 | A1  | *       | 4/2011  | Park   | H02M 1/4225  |
|              |     |         |         |        | 323/207      |
| 2011/0110127 | A1  | *       | 5/2011  | Lee    | G05F 1/70    |
|              |     |         |         |        | 363/44       |
| 2013/0063338 | A1  | *       | 3/2013  | Ma     | G06F 11/0706 |
|              |     |         |         |        | 345/156      |

FOREIGN PATENT DOCUMENTS

| CN | 201349124 Y |   | 11/2009 |
|----|-------------|---|---------|
| CN | 101989742 A |   | 3/2011  |
| CN | 102415214 A |   | 4/2012  |
| CN | 202424109 U |   | 9/2012  |
| CN | 202713490 U |   | 1/2013  |
| CN | 103311896 A |   | 9/2013  |
| CN | 103354344 A |   | 10/2013 |
| CN | 103887760 A |   | 6/2014  |
| CN | 203774767 U | * | 8/2014  |

OTHER PUBLICATIONS

Mar. 15, 2017—(CN) Third Office Action Appn 201410404297.8 with English Tran.
Mar. 11, 2016—(CN)—First Office Action Appn 201410404297.8 with English Tran.
Apr. 29, 2015—International Search Report and Written Opinion Appn PCT/CN2014/092525 with English Tran.
Sep. 9, 2017—(CN) Office Action application CN 201410404297.8 with English Translation.

* cited by examiner

ALTERNATING CURRENT-DIRECT CURRENT CONVERTER, POWER SUPPLY BOARD AND DISPLAY APPARATUS

The application is a U.S. National Phase Entry of International Application No. PCT/CN2014/092525 filed on Nov. 28, 2014, designating the United States of America and claiming priority to Chinese Patent Application No. 201410404297.8 filed on Aug. 15, 2014. The present application claims priority to and the benefit of the above-identified applications and the above-identified applications are incorporated by reference herein in their entirety.

TECHNICAL FIELD

The present disclosure relates to an alternating current-direct current (AC-DC) converter, a power supply board and a display apparatus.

BACKGROUND

A power supply board in a liquid crystal display apparatus (for example, a liquid crystal display and a liquid crystal display television) is configured to convert an inputted alternating current into a direct current to provide power supply for a backlight source and a liquid crystal driving circuit and so on. If there occurs in the backlight source and the liquid crystal driving circuit which are load of the power supply board a short circuit, it may result in over current, which would cause occurrence of hazardous conditions such as wire stock on fire and so on.

There already exists a corresponding protection circuit in the current power supply board to protect the condition of short circuit occurring to the load of the power supply board. An output voltage is monitored by the way of voltage dividing of resistors. When abnormality occurs to the voltage (for example, the output voltage is excessive), the power supply output is cut off to protect the load. However, when the load is shorted circuit, the current in the power supply board rises suddenly within a short time, which would cause strong current attack on devices of the load and the power supply board, and may cause damage to part of devices before the power supply output is cut off.

SUMMARY

There are provided in the present disclosure an AC-DC converter, a power supply board and a display apparatus, so as to solve the problem of damage to devices of a circuit caused by a sudden rise of a current when a load is shorted circuit in the prior art.

There is provided in an embodiment of the present disclosure an AC-DC converter, comprising:

an AC-DC converting circuit;

a transformer comprising a primary coil and a secondary coil, a first terminal of the primary coil being coupled to a positive output terminal of the AC-DC converting circuit, and a second terminal thereof being connected to a load;

a voltage monitoring circuit, whose input terminal is coupled to the first terminal of the secondary coil, and a second terminal of the secondary coil connected to a ground; and a control circuit, whose input terminal is coupled to an output terminal of the voltage monitoring circuit and output terminal is coupled to the AC-DC converting circuit;

wherein the voltage monitoring circuit outputs a control voltage when a voltage outputted by the first terminal of the secondary coil of the transformer exceeds a first threshold; the control circuit controls the AC-DC converting circuit to stop providing power supply when the control voltage exceeds a second threshold.

In the embodiment of the present disclosure, a transformer is disposed at the output terminal of the AC-DC converter, so that a current outputted by the AC-DC converting circuit is provided to the load after passing through the primary coil of the transformer. When the load is shorted circuit, the transformer is capable of slowing a rise of the output current of the AC-DC converter, such that the control circuit can cut off power supply providing in the rising process of the current and in the case of the current being not very strong, so as to avoid damage to devices caused by strong current attack on the devices.

Alternatively, the AC-DC converting circuit comprises a rectifier, a filtering capacitor and a switching converter;

A first input terminal of the rectifier is connected to a first output terminal of an alternating current power supply, and a second input terminal thereof is connected to a second output terminal of the alternating current power supply; a first output terminal thereof is connected to an input terminal of the switching converter and a positive electrode of the filtering capacitor respectively, and a second output terminal thereof is connected to a negative output terminal of the AC-DC converting circuit and a negative electrode of the filtering capacitor; and An output terminal of the switching converter is connected to a positive output terminal of the AC-DC converting circuit.

Alternatively, the voltage monitoring circuit comprises a first voltage-stabilizing tube, a first resistor and a second resistor connected in series;

A negative electrode of the first voltage-stabilizing tube is connected to an input terminal of the voltage monitoring circuit; and A first terminal of the first resistor is coupled to a positive electrode of the first voltage-stabilizing tube, a first terminal of the second resistor is coupled to a second terminal of the first resistor and further connected to the output terminal of the voltage monitoring circuit, and a second terminal of the second resistor is connected to the ground.

Alternatively, the first voltage-stabilizing tube is turned on when a voltage outputted by the first terminal of the secondary coil of the transformer that is received by the negative electrode of the first voltage-stabilizing tube of the voltage monitoring circuit exceeds the first threshold; the first resistor and the second resistor perform voltage dividing on a voltage outputted by the positive electrode of the first voltage-stabilizing tube, and the control voltage is outputted by the first terminal of the second resistor.

Alternatively, the control circuit comprises:

a relay coupled between the control circuit and the AC-DC converting circuit;

a control chip, whose signal input terminal is connected to an input terminal of the control circuit;

a high-frequency switching tube, whose control terminal is coupled to a signal output terminal of the control chip, source is connected to the relay, and drain is connected to the ground; and a third resistor, whose first terminal is connected to the control terminal of the high-frequency switching tube, and second terminal is connected to the ground.

Alternatively, the control chip controls the high-frequency switching tube to be turned on when the control voltage outputted by the voltage monitoring circuit that is received by the signal input terminal of the control chip of the control circuit exceeds the second threshold; and The turned-on high-frequency switching tube makes the relay of the control circuit act to cut off power supply providing of the AC-DC converting circuit.

Alternatively, the relay comprises a relay coil, a normally opened contact, a normally closed contact and a common terminal, a first terminal of the relay coil is connected to a high level power supply through a diode, and a second terminal thereof is connected to the high level power supply, the common terminal of the relay is connected to a first output terminal of the alternating current power supply, and the normally opened contact of the relay is connected to the first input terminal of the rectifier;

When the AC-DC converter operates normally, the normally opened contact and the common terminal of the relay are connected, and the first input terminal of the rectifier receives a voltage output signal of the alternating current power supply; when the load of the AC-DC converter is shorted, the normally closed contact and the common terminal of the relay are connected, and the first input terminal of the rectifier is unable to receive the voltage output signal of the alternating current power supply, so that power supply of the AC-DC converting circuit is cut off.

Alternatively, the AC-DC converting circuit further comprises a protective tube, which is arranged between the first output terminal of the alternating power supply and the common terminal of the relay. In the embodiment, security of the AC-DC converting circuit is further increased by disposing the protective tube.

There is provided in an embodiment of the present disclosure a power supply board, comprising the AC-DC converter provided in the embodiment described above.

There is provided in an embodiment of the present disclosure a display apparatus, comprising the power supply board provided in the embodiment described above.

DETAILED DESCRIPTION

Implementation process of embodiments of the present disclosure will be described below in detail by combining with figures of the specification. It should be noted that same or similar reference marks represent same or similar elements or elements having same or similar functions throughout the whole description. Embodiments described below with reference to the figures are illustrated for explaining the present disclosure, but cannot be understood as a limitation to the present disclosure.

Figure 1:
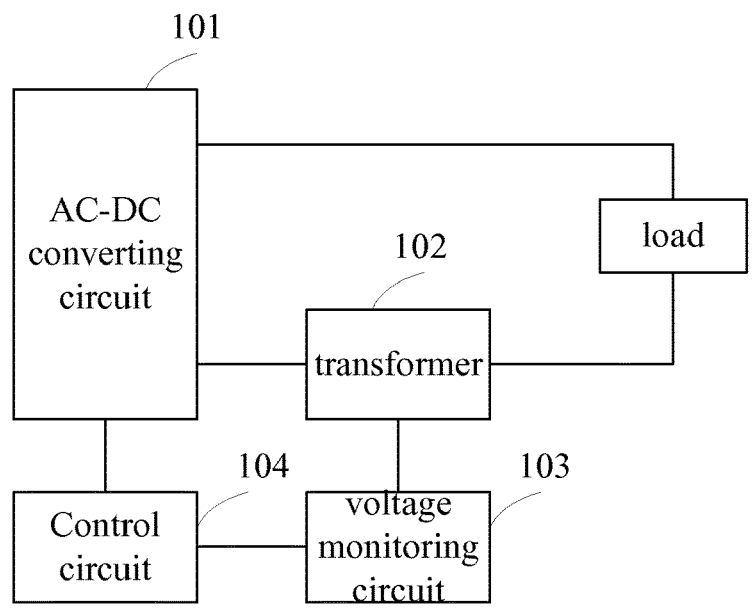
FIG. 1 is a schematic diagram of configuration of an AC-DC converter provided in an embodiment of the present disclosure.

FIG. 1 shows a schematic diagram of configuration of an AC-DC converter provided in an embodiment of the present disclosure. As shown in FIG. 1, the AC-DC converter comprises an AC-DC converting circuit 101, a transformer 102, a voltage monitoring circuit 103 and a control circuit 104.

The transformer 102 comprises a primary coil and a secondary coil, a first terminal of the primary coil is coupled to a positive output terminal of the AC-DC converting circuit, and a second terminal thereof is connected to a load, and a first terminal of the secondary coil is connected to an input terminal of the voltage monitoring circuit 103, and a second terminal thereof is connected to a ground.

An input terminal of the control circuit 104 is coupled to an output terminal of the voltage monitoring circuit 103, and an output terminal thereof is coupled to the AC-DC converting circuit 101.

The voltage monitoring circuit 103 outputs a control voltage when a voltage outputted by the first terminal of the secondary coil of the transformer 102 exceeds a first threshold; the control circuit 104 controls the AC-DC converting circuit 101 to stop providing power supply when the control voltage exceeds a second threshold.

In the embodiment of the present disclosure, a transformer is disposed at the output terminal of the AC-DC converter 100, so that a current outputted by the AC-DC converting circuit 101 is provided to the load after passing through the primary coil of the transformer 102. When the load is shorted, the transformer 102 is capable of slowing a rise of the output current of the AC-DC converter 100, so that the control circuit 104 can cut off power supply in the rising process of the current and in the case of the current being not very strong, so as to avoid damage to devices caused by attack of the strong current on the devices.

Figure 2:
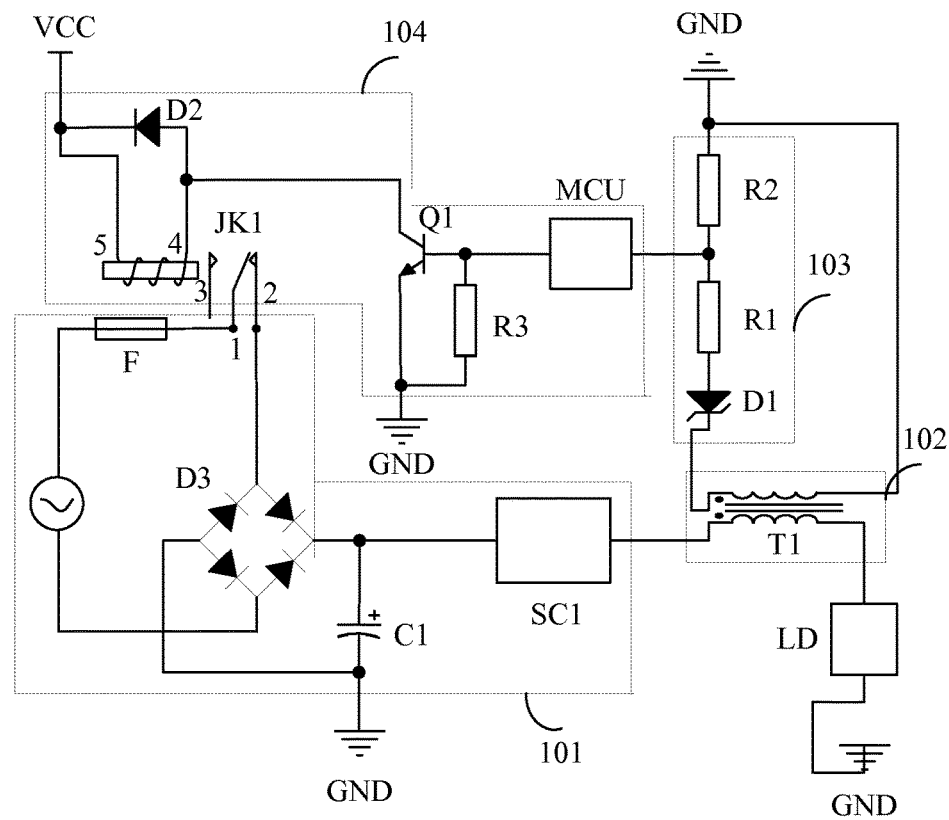
FIG. 2 is a schematic diagram of a circuit principle of an exemplary AC-DC converter provided in an embodiment of the present disclosure.

FIG. 2 shows a schematic diagram of a circuit principle an exemplary AC-DC converter provided according to the schematic diagram of the configuration of the AC-DC converter as shown in FIG. 1 as well as the concept of the present disclosure. The AC-DC converter comprises an AC-DC converting circuit 101, a transformer 102, a voltage monitoring circuit 103 and a control circuit 104.

A first terminal of the primary coil of the transformer 102 (a transformer T1 as shown in FIG. 2) is coupled to a positive output terminal of the AC-DC converting circuit, and a second terminal thereof is connected to a load; a first terminal of the secondary coil is coupled to an input terminal of the voltage monitoring circuit 103, and a second terminal thereof is connected to a ground GND.

An input terminal of the control circuit 104 is coupled to an output terminal of the voltage monitoring circuit 103, and an output terminal thereof is coupled to the AC-DC converting circuit 101.

The voltage monitoring circuit 103 outputs a control voltage when a voltage outputted by the first terminal of the secondary coil of the transformer 102 exceeds a first threshold; the control circuit 104 controls the AC-DC converting circuit 101 to stop providing power supply when the control voltage exceeds a second threshold.

The AC-DC converting circuit 101 comprises a rectifier D3, a filtering capacitor C1 and a switching converter SC1.

A first input terminal of the rectifier D3 is connected a first output terminal of an alternating current power supply, and a second input terminal thereof is connected to a second output terminal of the alternating current power supply; a first output terminal thereof is connected to an input terminal of the switching converter SC1 and a positive electrode of the filtering capacitor C1 respectively, and a second output terminal thereof is connected to a negative output terminal of the AC-DC converting circuit 101 and a negative electrode of the filtering capacitor C1.

An output terminal of the switching converter SC1 is connected to a positive output terminal of the AC-DC converting circuit 101.

In this embodiment, the rectifier D3 is a bridge rectifier constituted of a first diode, a second diode, a third diode and a fourth diode, and is configured to rectify an alternating current voltage received by an input terminal of the AC-DC converting circuit 101 into a direct current voltage. Of course, other types of rectifiers being capable of realizing AC-DC converting can also be selected. The filtering capacitor C1 filters a direct current voltage outputted by the rectifier D3, and the filtered direct current voltage can be converted into a direct current voltage having a different voltage value via the switching converter SC1. In the whole process of normal operation of the AC-DC converting circuit 101, a relay JK1 makes the AC-DC converting circuit 101 be in a turn-on state. When abnormal condition occurs, the relay JK1 makes the AC-DC converting circuit 101 be in a turn-off state, so as to cut off power supply providing of the AC-DC converting circuit 101.

The voltage monitoring circuit 103 comprises:

a first voltage-stabilizing tube D1, a first resistor R1 and a second resistor R2 connected in series;

a negative electrode of the first voltage-stabilizing tube D1 is connected to an input terminal of the voltage monitoring circuit 103; and a first terminal of the first resistor R1 is coupled to a positive electrode of the first voltage-stabilizing tube D1, a first terminal of the second resistor R2 is coupled to a second terminal of the first resistor R1 and further connected to the output terminal of the voltage monitoring circuit 103, and a second terminal of the second resistor R2 is connected to the ground GND.

In the operating process of the AC-DC converter, the first voltage-stabilizing tube D1 is turned on when a voltage outputted by the first terminal of the secondary coil of the transformer 102 that is received by the negative electrode of the first voltage-stabilizing tube D1 of the voltage monitoring circuit 103 exceeds the first threshold; the first resistor R1 and the second resistor R2 perform voltage dividing on a voltage outputted by the positive electrode of the first voltage-stabilizing tube D1, and the control voltage is outputted by the first terminal of the second resistor R2.

The first voltage-stabilizing tube D1 is turned on when a voltage outputted by the first terminal of the secondary coil of the transformer 102 that is received by the negative electrode of the first voltage-stabilizing tube D1 of the voltage monitoring circuit 103 exceeds the first threshold; the first resistor R1 and the second resistor R2 perform voltage dividing on a voltage outputted by the positive electrode of the first voltage-stabilizing tube D1, and the control voltage is outputted by the first terminal of the second resistor R2.

The control circuit 104 comprises:

a relay JK1 coupled between the control circuit 104 and the AC-DC converting circuit 101;

a control chip MCU, whose signal input terminal is an input terminal of the control circuit 104;

a high-frequency switching tube Q1, whose control terminal is coupled to a signal output terminal of the control chip MCU, source is connected to the relay JK1, and drain is connected to the ground GND; and a third resistor R3, whose first terminal is connected to the control terminal of the high-frequency switching tube Q1 and second terminal is connected to the ground GND.

In the operating process of the AC-DC converter, the control chip MCU controls the high-frequency switching tube Q1 to be turned on when the control voltage outputted by the voltage monitoring circuit 103 that is received by the signal input terminal of the control chip MCU of the control circuit 104 exceeds the second threshold; the turned-on high-frequency switching tube Q1 makes the relay JK1 of the AC-DC converting circuit 101 act to cut off power supply of the AC-DC converting circuit 101.

The relay JK1 comprises a relay coil (the relay coil comprises a first terminal 4 and a second terminal 5), a normally opened contact 2, a normally closed contact 3 and a common terminal 1, the first terminal 4 of the relay coil is connected to a high level power supply VCC through a diode D2, the second terminal 5 thereof is connected to the high level power supply VCC, the common terminal 1 of the relay JK1 is connected to a first output terminal of the alternating current power supply, and the normally opened contact 2 of the relay JK1 is connected to the first input terminal of the rectifier D3.

When the AC-DC converter operates normally, the normally opened contact 2 and the common terminal 1 of the relay JK1 are connected, and the first input terminal of the rectifier D3 receives the voltage output signal of the alternating current power supply; when the load of the AC-DC converter is shorted, the normally closed contact 3 and the common terminal 1 of the relay JK1 are connected, and the first input terminal of the rectifier D3 cannot receive the voltage output signal of the alternating current power supply, so that power supply of the AC-DC converting circuit 101 is cut off.

In this embodiment, the high-frequency switching tube Q1 can be an N channel or P channel power MOSFET, or a semiconductor switching device including IGBT. Of course, the control voltage provided for the N channel or P channel power MOSFET is different, for example, the N channel MOSFET is turned on at a high level, and the P channel MOSFET is turned on at a low level, only if the relay JK1 is ensured being cut off when the load is shorted. Further details are not provided herein.

Alternatively, the AC-DC converting circuit further comprises a protective tube F, which is arranged between the first output terminal of the alternating power supply and the common terminal of the relay JK. In the embodiment, security of the AC-DC converting circuit is increased by disposing the protective tube F.

In this embodiment, the AC-DC converter has the following operating principle:

When a short circuit occurs to the output terminal of the AC-DC converting circuit 101, the current over the primary coil of the transformer T1 changes greatly, and the primary coil produces an inductive voltage U1, so that the secondary coil of the transformer T1 produces an inductive voltage U2. If U2 is greater than the first threshold (the first threshold is a breakdown voltage of the first voltage-stabilizing tube D1), then the first voltage-stabilizing tube D1 is broken down, and the voltage applied to the voltage-dividing resistors R1 and R2 is U2-Vd (Vd is a voltage of the first voltage-stabilizing tube), so that the dividing voltage between the first resistor R1 and the second resistor R2 is UC=(U2−Vd)*R2/(R1+R2). This dividing voltage UC is provided to the control chip MCU. If the dividing voltage UC is greater than the second threshold (the second threshold is predetermined in the control chip MCU), then it is determined that the output terminal of the AC-DC converter is shorted (i.e., the load is shorted). The control chip MCU outputs a control signal to turn on the high-frequency switching tube Q1, so that the voltage of the first terminal 1 of the relay coil of the relay JK1 is connected to the ground GND through the source and drain of the high-frequency switching tube Q1. The normally closed contact 3 and the common terminal 1 of the relay JK1 are connected, and the first input terminal of the rectifier D3 cannot receive the voltage output signal of the alternating power supply, so as to cut off power supply of the AC-DC converting circuit 101. If the dividing voltage UC is smaller than the second threshold, then it is determined that the output terminal of the AC-DC converter is just a normal increase of the load current.

Figure 3:
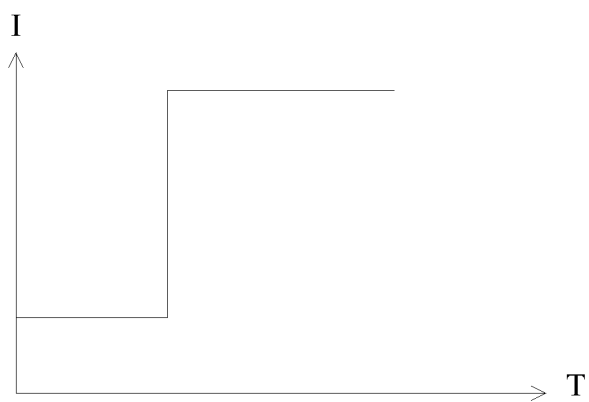
FIG. 3 is a schematic diagram of current changing with time when a short circuit occurs in a load as know.

FIG. 3 is a schematic diagram of current changing with time when the load is shorted circuit in a known AC-DC converter, where I is current and T is time. In the known AC-DC converter, the current rises suddenly when the load of the AC-DC converter is shorted.

Figure 4:
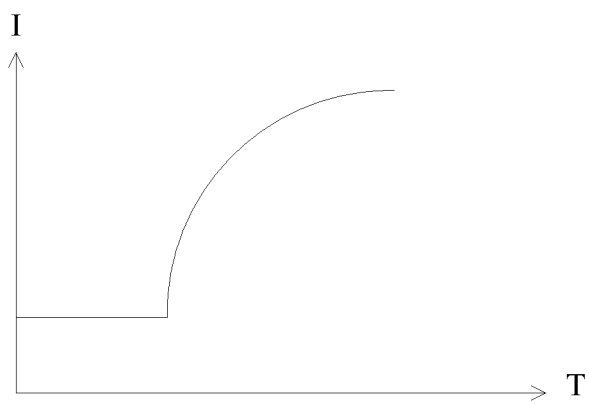
FIG. 4 is a schematic diagram of current changing with time when a short circuit occurs in a load in an AC-DC converter provided in an embodiment of the present disclosure.

FIG. 4 shows is a schematic diagram of current changing with time when the load is shorted in the AC-DC converter provided in an embodiment of the present disclosure, where I is current and T is time. The tends of the current I as the time T changes is a curve, so that the rising time of the current is delayed, which provides a buffer time to cut off power supply, thereby avoiding the AC-DC converter and devices of the load terminal from being attacked by the strong current.

The AC-DC converter in the embodiment of the present disclosure has the following advantageous effects: a transformer is disposed at the output terminal of the AC-DC converter provided in the embodiment of the present disclosure, such that the current outputted by the AC-DC converting circuit is provided to the load after passing through the primary coil of the transformer. When the load is shorted, the transformer is capable of slowing the rising of the output current of the AC-DC converter, such that the control circuit can cut off power supply in the process of current rising and in the case of the current being not very strong, so as to avoid the damage to the devices caused by the attack of the strong current on the devices. Further, the transformer is capable of making the output terminal of the AC-DC converter separated from the voltage monitoring circuit and the control circuit, thereby ensuring that the AC-DC converter would not be attacked by the short-circuit current.

There is provided in an embodiment of the present disclosure a power supply board, comprising the AC-DC converter as provided in the first embodiment.

The power supply board in the embodiment of the present disclosure has the following advantageous effects: a transformer is disposed at the output terminal of the AC-DC converter provided in the embodiment of the present disclosure, such that the current outputted by the AC-DC converting circuit is provided to the load after passing through the primary coil of the transformer. When the load is shorted circuit, the transformer is capable of slowing the rising of the output current of the AC-DC converter, such that the control circuit can cut off power supply providing in the process of current rising and in the case of the current being not very strong, so as to avoid the damage to the devices caused by the attack of the strong current on the devices. Further, the transformer is capable of making the output terminal of the AC-DC converter separated from the voltage monitoring circuit and the control circuit, thereby ensuring that the AC-DC converter would not be attacked by the short-circuit current.

There is provided in an embodiment of the present disclosure a display apparatus, comprising the power supply board provided in the second embodiment described above.

The display apparatus in the embodiment of the present disclosure has the following advantageous effects: a transformer is disposed at the output terminal of the AC-DC converter provided in the embodiment of the present disclosure, such that the current outputted by the AC-DC converting circuit is provided to the load after passing through the primary coil of the transformer. When the load is shorted circuit, the converter is capable of slowing the rising of the output current of the AC-DC converter, such that the control circuit can cut off power supply providing in the process of current rising and in the case of the current being not very strong, so as to avoid the damage to the devices caused by the attack of the strong current on the devices. Further, the transformer is capable of making the output terminal of the AC-DC converter separated from the voltage monitoring circuit and the control circuit, thereby ensuring that the AC-DC converter would not be attacked by the short-circuit current.

Obviously, those skilled in the art can make various alternations and modifications to the present disclosure without departing from the spirit and scope of the present disclosure. If these alternations and modifications of the present disclosure belong to the scope of the claims of the present disclosure as well as their equivalent technology, then the present disclosure intends to comprise these alternations and modifications.

The present application claims the priority of a Chinese patent application No. 201410404297.8 filed on Aug. 15, 2014. Herein, the content disclosed by the Chinese patent application is incorporated in full by reference as a part of the present disclosure.

What is claimed is:

1. An AC-DC converter, comprising:
   an AC-DC converting circuit;
   a transformer comprising a primary coil and a secondary coil, a first terminal of the primary coil being coupled to a positive output terminal of the AC-DC converting circuit, and a second terminal of the primary coil being connected to a load;
   a voltage monitoring circuit, whose input terminal is coupled to a first terminal of the secondary coil, and a second terminal of the secondary coil connected to a ground; and
   a control circuit, whose input terminal is coupled to an output terminal of the voltage monitoring circuit, and whose output terminal is coupled to a first output terminal of an alternating current power supply, and a first input terminal of a rectifier of the AC-DC converting circuit;
   wherein the voltage monitoring circuit is configured to output a control voltage when a voltage outputted by the first terminal of the secondary coil of the transformer exceeds a first threshold; the control circuit is configured to control the AC-DC converting circuit to stop providing power supply when the control voltage exceeds a second threshold;
   the voltage monitoring circuit comprises a first voltage-stabilizing tube, a first resistor and a second resistor connected in series;
   a negative electrode of the first voltage-stabilizing tube is connected to the input terminal of the voltage monitoring circuit; and
   a first terminal of the first resistor is coupled to a positive electrode of the first voltage-stabilizing tube, a first terminal of the second resistor is coupled to a second terminal of the first resistor and further coupled to the output terminal of the voltage monitoring circuit, and a second terminal of the second resistor is connected to the ground.

2. The AC-DC converter according to claim 1, wherein the AC-DC converting circuit comprises a rectifier, a filtering capacitor and a switching converter;
a first input terminal of the rectifier is connected to a first output terminal of an alternating current power supply, and a second input terminal of the rectifier is connected to a second output terminal of the alternating current power supply; a first output terminal of the rectifier is connected to an input terminal of the switching converter and a positive electrode of the filtering capacitor, and a second output terminal of the rectifier is connected to a negative output terminal of the AC-DC converting circuit and a negative electrode of the filtering capacitor; and
an output terminal of the switching converter is connected to the positive output terminal of the AC-DC converting circuit.

3. The AC-DC converter according to claim 1, wherein the first voltage-stabilizing tube is turned on when a voltage outputted by the first terminal of the secondary coil of the transformer that is received by the negative electrode of the first voltage-stabilizing tube of the voltage monitoring circuit exceeds the first threshold; the first resistor and the second resistor perform voltage dividing on a voltage outputted by the positive electrode of the first voltage-stabilizing tube, and the control voltage is outputted by the first terminal of the second resistor.

4. The AC-DC converter according to claim 1, wherein the control circuit comprises:
a relay coupled between the control circuit and the AC-DC converting circuit;
a control chip, whose signal input terminal is connected to the input terminal of the control circuit;
a high-frequency switching tube, whose control terminal is coupled to a signal output terminal of the control chip, whose source is connected to the relay, and whose drain is connected to the ground; and
a third resistor, whose first terminal is connected to the control terminal of the high-frequency switching tube, and second terminal is connected to the ground.

5. The AC-DC converter according to claim 4, wherein the control chip is configured to control the high-frequency switching tube to be turned on when the control voltage outputted by the voltage monitoring circuit that is received by the signal input terminal of the control chip of the control circuit exceeds the second threshold; and
the turned-on high-frequency switching tube makes the relay of the control circuit act to cut off power supply provided from the AC-DC converting circuit.

6. The AC-DC converter according to claim 4, wherein the AC-DC converting circuit comprises a rectifier, wherein the relay comprises a relay coil, a normally opened contact, a normally closed contact and a common terminal, a first terminal of the relay coil is connected to a high level power supply through a diode, and a second terminal thereof is connected to the high level power supply, the common terminal of the relay is connected to a first output terminal of an alternating current power supply, and the normally opened contact thereof is connected to a first input terminal of the rectifier; and
when the AC-DC converter operates normally, the normally opened contact and the common terminal of the relay are connected, and the first input terminal of the rectifier receives a voltage output signal of the alternating current power supply; when the load of the AC-DC converter is shorted, the normally closed contact and the common terminal of the relay are connected, and the first input terminal of the rectifier is unable to receive the voltage output signal of the alternating current power supply so that power supply of the AC-DC converting circuit is cut off.

7. The AC-DC converter according to claim 4, wherein the AC-DC converting circuit further comprises a protective tube, which is arranged between a first output terminal of the alternating current power supply and a common terminal of the relay.

8. A power supply board comprising the AC-DC converter according to claim 1.

9. A display apparatus, comprising the power supply board according to claim 8.

10. The AC-DC converter according to claim 4, wherein the AC-DC converting circuit comprises a rectifier, a filtering capacitor and a switching converter;
a first input terminal of the rectifier is connected to a first output terminal of an alternating current power supply, and a second input terminal the rectifier is connected to a second output terminal of the alternating current power supply; a first output terminal of the rectifier is connected to an input terminal of the switching converter and a positive electrode of the filtering capacitor, and a second output terminal of the rectifier is connected to a negative output terminal of the AC-DC converting circuit and a negative electrode of the filtering capacitor; and
an output terminal of the switching converter is connected to the positive output terminal of the AC-DC converting circuit.

11. The AC-DC converter according to claim 4, wherein the first voltage-stabilizing tube is turned on when a voltage outputted by the first terminal of the secondary coil of the transformer that is received by the negative electrode of the first voltage-stabilizing tube of the voltage monitoring circuit exceeds the first threshold; the first resistor and the second resistor perform voltage dividing on a voltage outputted by the positive electrode of the first voltage-stabilizing tube, and the control voltage is outputted by the first terminal of the second resistor.

12. The AC-DC converter according to claim 5, wherein the AC-DC converting circuit comprises a rectifier, wherein the relay comprises a relay coil, a normally opened contact, a normally closed contact and a common terminal, a first terminal of the relay coil is connected to a high level power supply through a diode, and a second terminal thereof is connected to the high level power supply, the common terminal of the relay is connected to a first output terminal of an alternating current power supply, and the normally opened contact thereof is connected to a first input terminal of the rectifier; and
when the AC-DC converter operates normally, the normally opened contact and the common terminal of the relay are connected, and the first input terminal of the rectifier receives a voltage output signal of the alternating current power supply; when the load of the AC-DC converter is shorted, the normally closed contact and the common terminal of the relay are connected, and the first input terminal of the rectifier is unable to receive the voltage output signal of the alternating current power supply so that power supply of the AC-DC converting circuit is cut off.

13. The power supply board according to claim 8, wherein the AC-DC converting circuit comprises a rectifier, a filtering capacitor and a switching converter;
 a first input terminal of the rectifier is connected to a first output terminal of an alternating current power supply, and a second input terminal of the rectifier is connected to a second output terminal of the alternating current power supply; a first output terminal of the rectifier is connected to an input terminal of the switching converter and a positive electrode of the filtering capacitor, and a second output terminal of the rectifier is connected to a negative output terminal of the AC-DC converting circuit and a negative electrode of the filtering capacitor; and
 an output terminal of the switching converter is connected to the positive output terminal of the AC-DC converting circuit.

14. The power supply board according to claim 8, wherein the first voltage-stabilizing tube is turned on when a voltage outputted by the first terminal of the secondary coil of the transformer that is received by the negative electrode of the first voltage-stabilizing tube of the voltage monitoring circuit exceeds the first threshold; the first resistor and the second resistor perform voltage dividing on a voltage outputted by the positive electrode of the first voltage-stabilizing tube, and the control voltage is outputted by the first terminal of the second resistor.

15. The power supply board according to claim 8, wherein the control circuit comprises:
 a relay coupled between the control circuit and the AC-DC converting circuit;
 a control chip, whose signal input terminal is connected to the input terminal of the control circuit;
 a high-frequency switching tube, whose control terminal is coupled to a signal output terminal of the control chip, whose source is connected to the relay, and whose drain is connected to the ground; and
 a third resistor, whose first terminal is connected to the control terminal of the high-frequency switching tube, and second terminal is connected to the ground.

16. The power supply board according to claim 15, wherein the control chip is configured to control the high-frequency switching tube to be turned on when the control voltage outputted by the voltage monitoring circuit that is received by the signal input terminal of the control chip of the control circuit exceeds the second threshold; and
 the turned-on high-frequency switching tube makes the relay of the control circuit act to cut off power supply provided from the AC-DC converting circuit.

* * * * *